(12) United States Patent
Scanlon, Jr.

(10) Patent No.: US 6,541,161 B1
(45) Date of Patent: Apr. 1, 2003

(54) LITHIUM ION CONDUCTING CHANNEL VIA MOLECULAR SELF-ASSEMBLY

(75) Inventor: Lawrence G. Scanlon, Jr., Fairborn, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/949,523

(22) Filed: Sep. 10, 2001

(51) Int. Cl.$^7$ .......................... H01M 6/18; H01G 9/025
(52) U.S. Cl. ...................... 429/306; 429/322; 252/62.2
(58) Field of Search ................... 429/188, 304, 429/306, 322; 252/62.2

(56) References Cited

U.S. PATENT DOCUMENTS 4,251,607 A * 2/1981 Yamaki et al. .............. 429/199

5,932,133 A    8/1999 Scanlon

OTHER PUBLICATIONS

Datasheet for dilithium phthalocyanine [online]. Cambridge Soft Corporation, 2002 [retrieved on Nov. 6, 2002]. Retrieved from the Internet: <URL: www.chemfinder.cambridgesoft.com/result.asp>.*

L.G. Scanlon, L.R. Lucente, W.A. Feld, G. Sandi, D.J. Campo, A.E. Turner, C.S. Johnson and R.A. Marsh, Lithium–Ion Conducting Channel, Proceedings of the International Workshop on Electrochemical Systems, A.R. Landgrebe, R.J. Klinger (eds), vol. 36, pp 326–339 (2001), published Jul. 2001 (prepublication copy).

* cited by examiner

Primary Examiner—Patrick Ryan
Assistant Examiner—Susy Tsang-Foster
(74) Attorney, Agent, or Firm—Charles E. Bricker; Thomas L. Kundert

(57) ABSTRACT

An electrolyte for an electrochemical cell consisting of a di-lithium phthalocyanine.

4 Claims, 7 Drawing Sheets

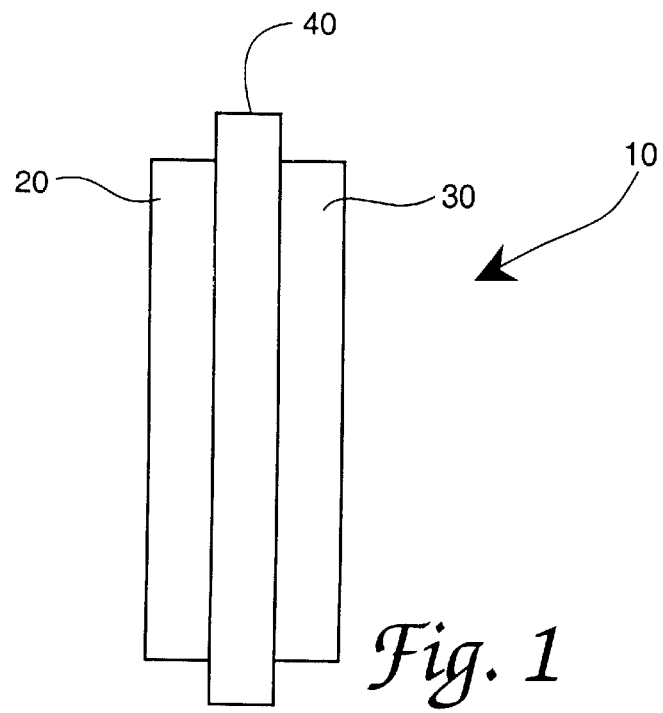
Fig. 1
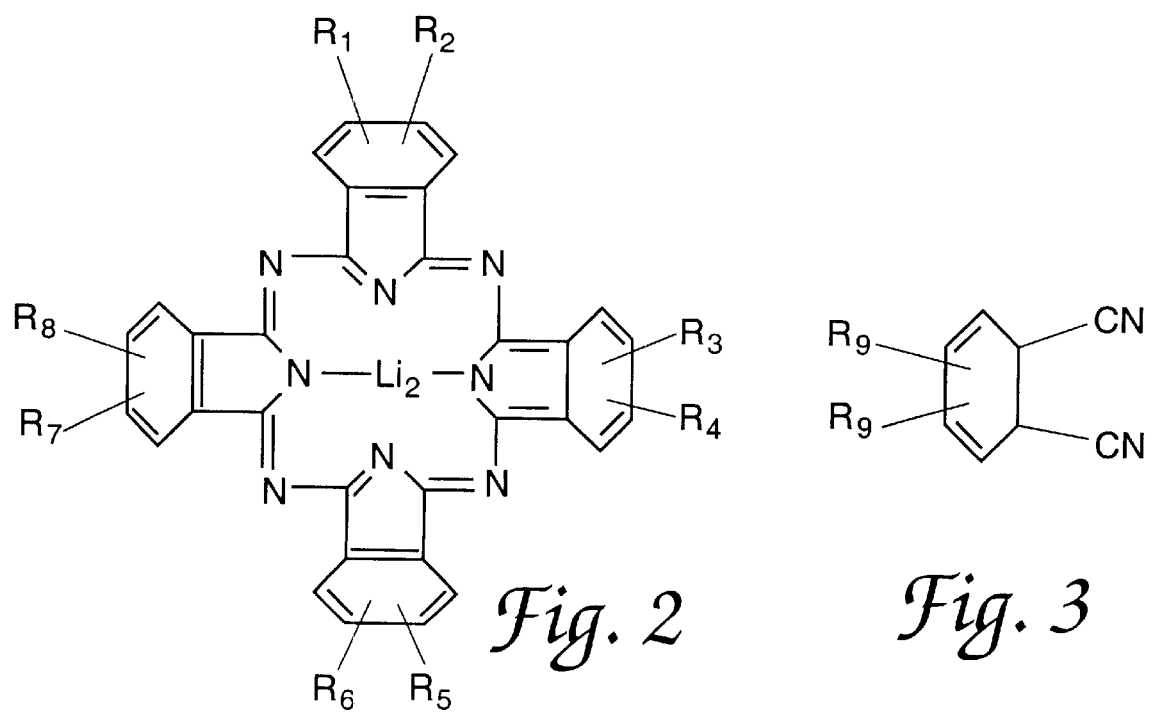
Fig. 2
Fig. 3

LITHIUM ION CONDUCTING CHANNEL VIA MOLECULAR SELF-ASSEMBLY

RIGHTS OF THE GOVERNMENT

The invention described herein may be manufactured and used by or for the Government of the United States for all governmental purposes without the payment of any royalty.

BACKGROUND OF THE INVENTION

The present invention is directed to the fabrication of a lithium ion-conducting electrolyte material.

Ion conducting polymer electrolytes with ionic conductivities on the order of $10^{-3}$ S/cm at ambient temperatures have been prepared by incorporating non-aqueous liquid electrolytes into polymer matrices. For example, in a lithium cell, the anion of the lithium salt is bonded to the polymer matrix thus resulting in single ionic conductivity upon dissociation of the salt in the non-aqueous media. Because of the presence of volatile organic plasticizers (non-aqueous liquid) these electrolytes suffer from poor dimensional and thermal stability. In addition they are very susceptible to degradation through corrosion/passivation reactions with lithium metal electrodes. Thus, it is desirable to improve the operating characteristics of electrolytes and to overcome these and other operational limitations inherent in electrochemical devices. One way of overcoming the limitations of the materials currently used in the electrochemical art is to develop and investigate new materials for their potential application in electrochemical cells.

In U.S. Pat. No. 5,932,133, issued Aug. 3, 1999, to Lawrence G. Scanlon, Jr., I disclose an electrolyte composition consisting essentially of a major amount of a lithium phthalocyanine and a minor amount of a polymer binder, and an electrolyte composition consisting essentially of aligned and spaced lithium phthalocyanine rings, wherein alignment and spacing of the phthalocyanine rings is achieved through the use of ladder type polymers, comb-like polymers, or crystalline polymers. I have now found that the polymer binder and/or the spacing polymers can be eliminated, thus providing an electrolyte consisting solely of a lithium phthalocyanine.

Accordingly, it is an object of the present invention to provide novel lithium ion-conducting materials which can be used as an electrolyte.

Other objects and advantages of the present invention will be apparent to those skilled in the art.

SUMMARY OF THE INVENTION

In accordance with the present invention there is provided an electrolyte consisting of a di-lithium phthalocyanine.

BRIEF DESCRIPTION OF THE DRAWINGS

In the drawings,

FIG. 1 is a representation of an electrochemical cell including an electrolyte in accordance with the invention;

FIG. 2 illustrates dilithium phthalocyanines suitable for use in the present invention;

FIG. 3 illustrates a benzenedicarbonitrile;

DESCRIPTION OF THE PREFERRED EMBODIMENT

Figure 4:
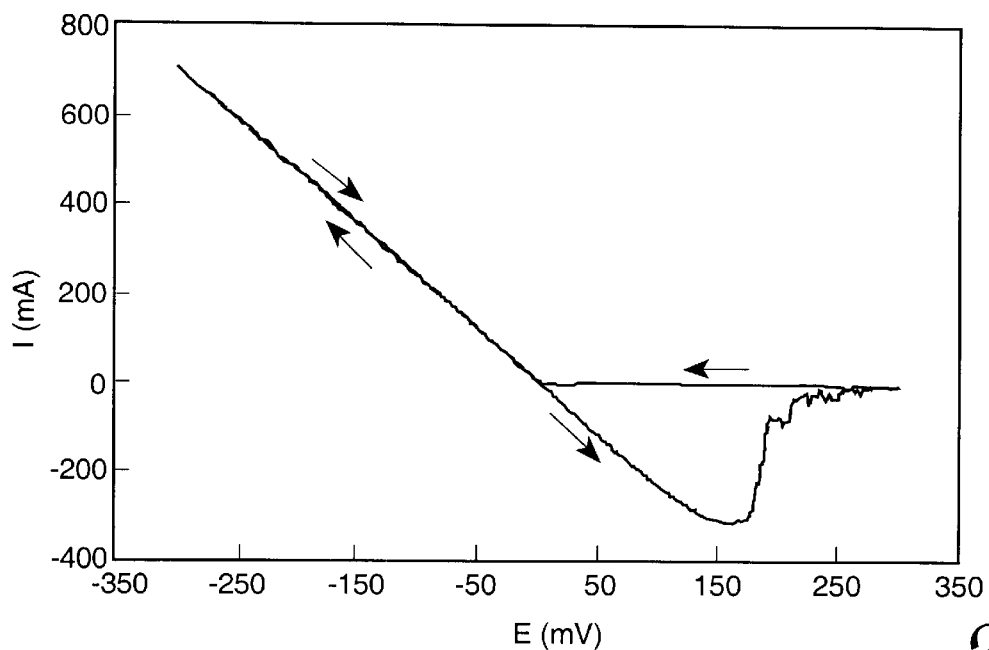
FIG. 4 is a cyclic voltammogram of test cell #1 at −10° C.

Referring to FIG. 1, there is illustrated a representation of an electrochemical cell 10 including a positive electrode 20, a negative electrode 30 and a di-lithium phthalocyanine electrolyte 40 disposed between the electrodes. Either one or both of the electrodes can be composite electrodes. As used herein and as is generally accepted in the industry, a composite electrode refers to an electrode which includes at least an electrode active material as well as a polymeric material which serves as both binder and to improve conductivity.

The positive electrode 20 may be fabricated including a electrode active material selected from the group of $LiMnO_2$, $V_6O_{13}$, $V_2O_5$, and combinations thereof. The polymeric material used may be either a single polymer or a blend of polymers which provide the desired mechanical strength and high ionic conductivity. The polymer may be selected from the group of, but not limited to, polyesters, polyethers, poly(urethane), poly(ethyloxide), poly(vinylidine fluoride), poly(acrylonitrile), poly(tetrafluoroethylene), and combinations thereof. In a composite electrode, the polymer or polymer blend may comprise up to about 60% of the composite electrode, and typically comprises between five and forty percent of the composite electrode.

The negative electrode 30 or anode of the cell 10 may also be fabricated as a composite electrode. In this case, the composite electrode forming negative electrode 30 includes a polymer or polymer blend as described above with respect to electrode 20. The composite electrode 30 further includes a negative electrode active material selected from the group of materials consisting of carbon, activated carbon, graphite, petroleum coke, lithium alloys, such as LiAl, low voltage lithium intercalation compounds, such as $TiS_2$ and $MoS_2$, and combinations thereof. Once again, the polymer or polymer blend comprises between 5 and 40 percent of the total electrode.

Disposed between the positive and negative electrodes is the di-lithium phthalocyanine electrolyte 40.

The dilithium phthalocyanines suitable for use in the present invention have the structure shown in FIG. 2, wherein the $R_1$ through $R_8$ groups are the same or different, and are independently selected from H, $C_1$ to $C_{20}$ alkyl, $C_2$ to $C_{20}$ alkenyl, $-X^1-COO-X^2$, $-X^1-O-Y$, $-X^1-C_6H_5$ and $-X^1-COZ$ wherein $X^1$ is selected from the group consisting of a chemical bond, $-(CH_2)_n-$ where n is 1 to 20, $-(CH_2)_a-CH=CH-(CH_2)_b-$ wherein a and b each has a value of 0 to 20 and the sum a+b has a value of 1 to 20, $X^2$ is selected from the group consisting of $C_1$ to $C_{20}$ alkyl, $C_2$ to $C_{20}$ alkenyl, Y is selected from the group consisting of $C_1$ to $C_{20}$ alkyl, $C_2$ to $C_{20}$ alkenyl, or H, and Z is selected from the group consisting of $-OH$ and $-NR^1R^2$ wherein $R^1$ and $R^2$ are selected from the group consisting of H, $C_1$ to $C_{20}$ alkyl and $C_2$ to $C_{20}$ alkenyl.

These phthalocyanines can be prepared by reacting a benzenedicarbonitrile of the general formula shown in FIG.

3, wherein $R_9$ represents any of the $R_1$ to $R_8$ as shown above, with a lithium alkoxide of the formula LiOR, wherein R is a $C_1$ to $C_{20}$ alkyl group, preferably $C_3$ to $C_{15}$. The conversion of the benzenedicarbonitrile to the phthalocyanine is carried out in the alcohol corresponding to the lithium alkoxide employed, i.e., lithium ethoxide in ethyl alcohol, lithium pentoxide in pentanol.

The dilithium phthalocyanine electrolyte is formed by compressing a quantity of the phthalocyanine to form an electrolyte pellet. Alternatively, the electrolyte can be formed by casting from a suitable, low dielectric solvent, such as acetone, using techniques known in the art.

For use in a cell, the positive and negative electrodes and the dilithium phthalocyanine electrolyte of this invention must be assembled into a package. Design and fabrication of suitable packaging arrangements are within the purview of those skilled in the art. Generally, such cells are assembled in a controlled environment and then sealed with some type of case structure.

The following example illustrates the invention:

EXAMPLE

Dilithium phthalocyanine was purchased from Aldrich and dried under reduced pressure at 80° C. for 18 hours. This was accomplished in a vacuum oven antechamber attached to a Vacuum Atmospheres dry box that uses helium for the inert atmosphere. The phthalocyanine was then moved into the dry box from this chamber and pellets were fabricated using a Carver press. Approximately 80 mg of dilithium phthalocyanine was used for each pellet. The area of the pellet was on the order of 1 cm² and thickness was approximately 500 $\mu$m. Pellets prepared from this dried material were then used in the assembly of two electrode cells for electrochemical characterization. Lithium metal was used as the counter and reference electrode, copper as the working electrode and dilithium phthalocyanine as the solid state electrolyte. Two test cells were prepared: test cell #1 and test cell #2 were prepared for electrochemical characterization. Test cell #1 was used for electrochemical characterization at ambient and subambient temperatures. The purpose of test cell #2 was to verify the experimental results of test cell #1 at ambient temperature (i.e., to demonstrate the transport of lithium ions in a solid state electrolyte). A third two electrode electrochemical cell, test cell #3, was prepared using dilithium phthalocyanine, also purchased from Aldrich, but with a different lot number from the dilithium phthalocyanine used in test cells #1 and #2. In addition, the dilithium phthalocyanine used in test cell #3 was purified as follows. All solvents were dried over 3A molecular sieves for 24 h. Dilithium phthalocyanine was dissolved in anhydrous acetone (1 g/100 mL). The mixture was stirred for 15 min and then filtered. The solid was discarded and the filtrate was concentrated (one-tenth volume) on a rotary evaporator. The concentrated solution was slowly added over a period of 20 min to a stirring mixture of anhydrous toluene/hexanes (100 mL, 49:1). This mixture was allowed to stir at room temperature for 15 min, and then was placed in a refrigerator for an additional 60 min. After cooling, the mixture was filtered and the solid was dried at 50° C. for 72 hours.

The electrochemical impedance measurements for determining ionic conductivity were accomplished using a two electrode cell using EG&G impedance spectrometer model 398 software interfaced with an EG&G potentiostat/galvanostat model 273A and EG&G lock-in amplifier model 5210 taken in the frequency range from 0.1 Hz to 100 kHz. The measurements were obtained without polarization and used a sinusoidal signal of 5 mV. The voltammetric and galvanostatic plating/stripping data were produced using a two electrode cell and the same EG&G equipment. The electrochemical measurements were performed inside the dry box. Electrochemical characterization at subambient temperatures was performed using an insulated glass vessel that contained the electrochemical cell under a helium atmosphere and was partially submerged in a controlled temperature bath. The glass vessel was equipped with electrical wires and a thermocouple that allowed one to connect the cell with the EG&G equipment and measure the temperature of the cell as well.

Test Cell #1

The cyclic voltammogram of a two electrode cell, test cell #1, run at −10° C. is shown in FIG. 4. Lithium foil was used as the counter and reference electrode, a thin foil of copper was used as the working electrode and a pellet of dilithium phthalocyanine, 589 $\mu$m thick, was used as the electrolyte. Since the cyclic voltammogram was run at −10° C., the scan rate used was 20 $\mu$V/s. The smallest electrode area used in the cell was that of the lithium electrode at 0.385 cm². The peak current in the anodic region of the cyclic voltammogram was 316 mA at 157 mV.

Figure 5:
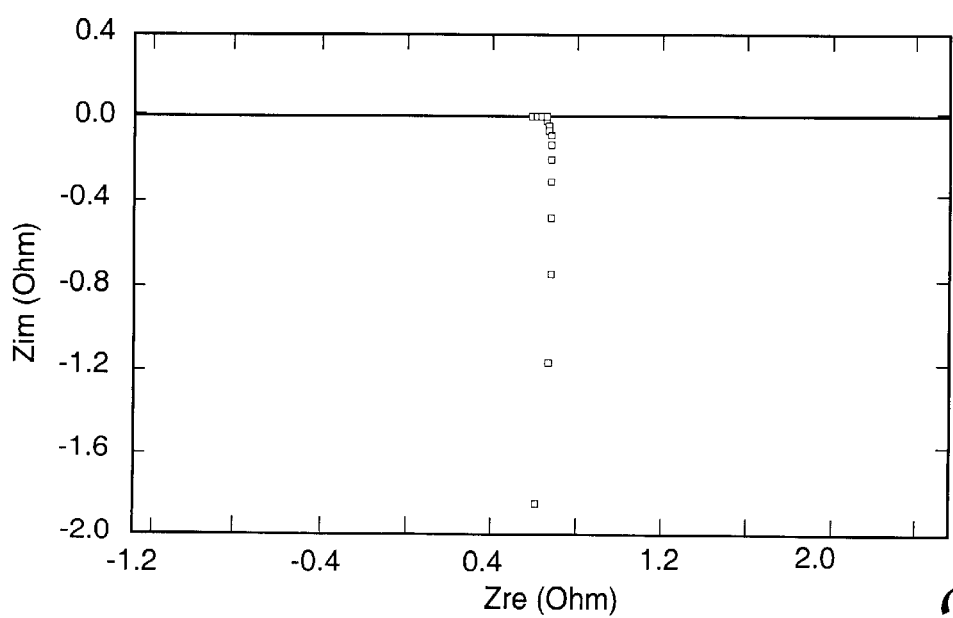
FIGS. 5–7 illustrate the Nyquist, Bode phase and Bode absolute complex impedance plots, respectively, for test cell #1 at −10° C.
Figure 6:
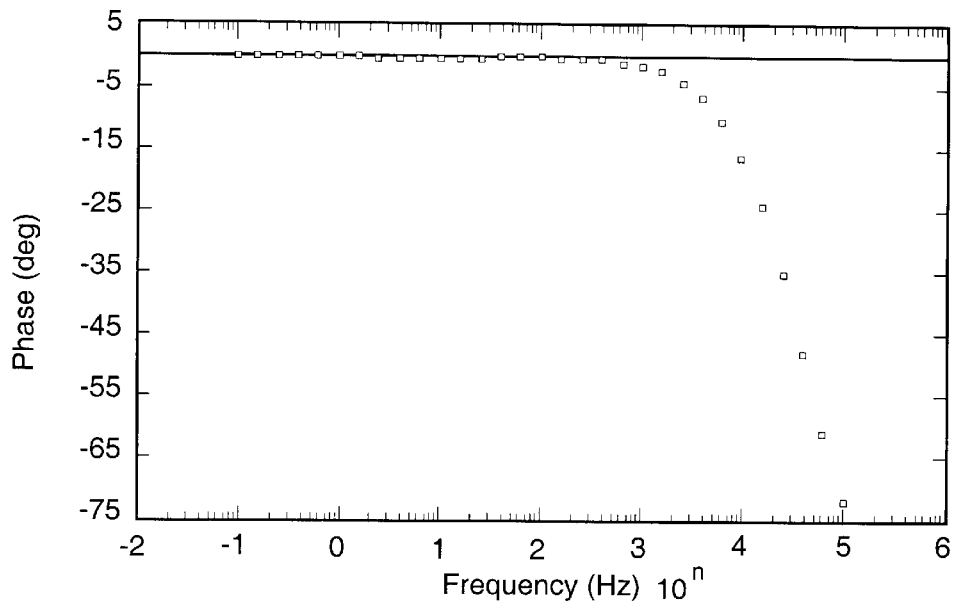
Figure 7:
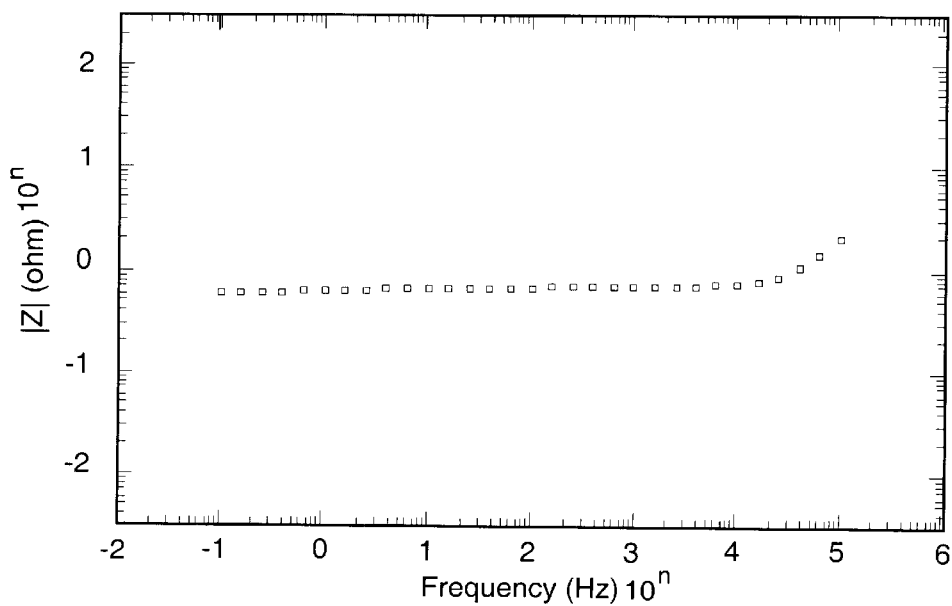

The resistance of the electrolyte in test cell #1 at −10° C. was determined by complex impedance. Nyquist and Bode plots used for this determination are shown in FIGS. 5–7. The Bode phase angle plot is indicative of ohmic behavior since the phase angle is zero over most of the frequency range as expected for a single ion conductor. The value of the resistance at 0.1 Hz was 0.6 ohms and corresponds to a specific conductivity of $2.5\times10^{-1}$ S/cm at −10° C. The plating and stripping of lithium, as shown in FIG. 4, is consistent with the transport of lithium ions through the solid state ionically conducting channel.

Figure 8:
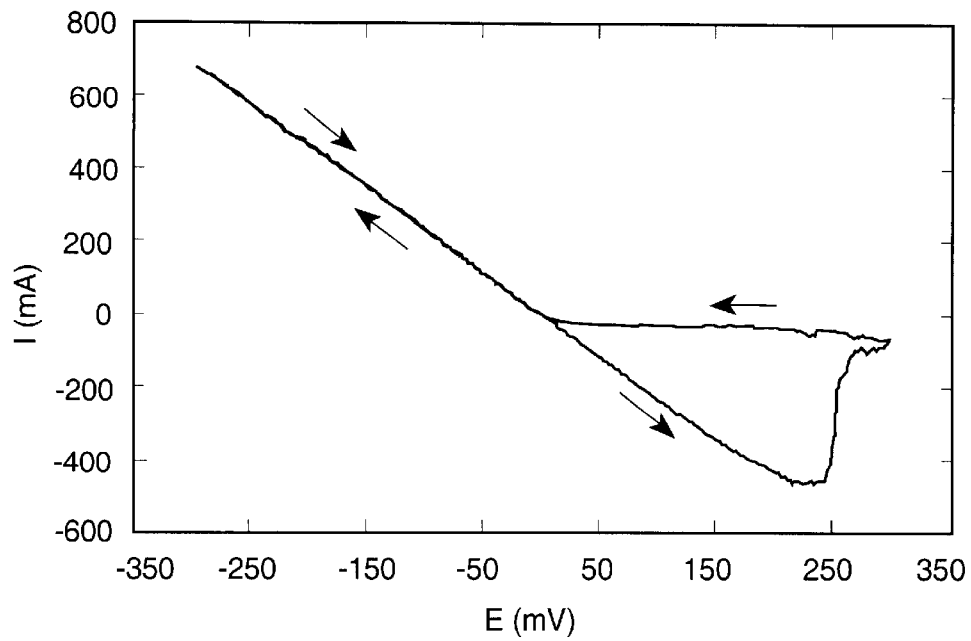
FIG. 8 is a cyclic voltammogram of test cell #1 at −31° C.

The cyclic voltammogram of test cell #1, where the temperature of the cell was lowered to −31° C. from −10° C., is shown in FIG. 8. The scan rate was 20 $\mu$V/s. At the lower temperature, the peak current in the anodic region of the cyclic voltammogram was 466 mA at 228 mV. The polarization of the peak current at 228 mV is expected for the lower temperature of −31° C. compared to 157 mV at −10° C. However, it is interesting that the peak current increased, perhaps due to reduced vibrations within the molecular lattice. The resistance of the cell as measured by complex impedance was 0.5 ohms. Cycling was continued for seven days at the scan rate of 20 $\mu$V/s. At the end of this testing, the peak current in the anodic region was 442 mA at 253.7 mV. In view of this, there appears to be relatively good electrochemical stability at the lithium metal anode/solid state channel electrolyte interface.

Figure 9:
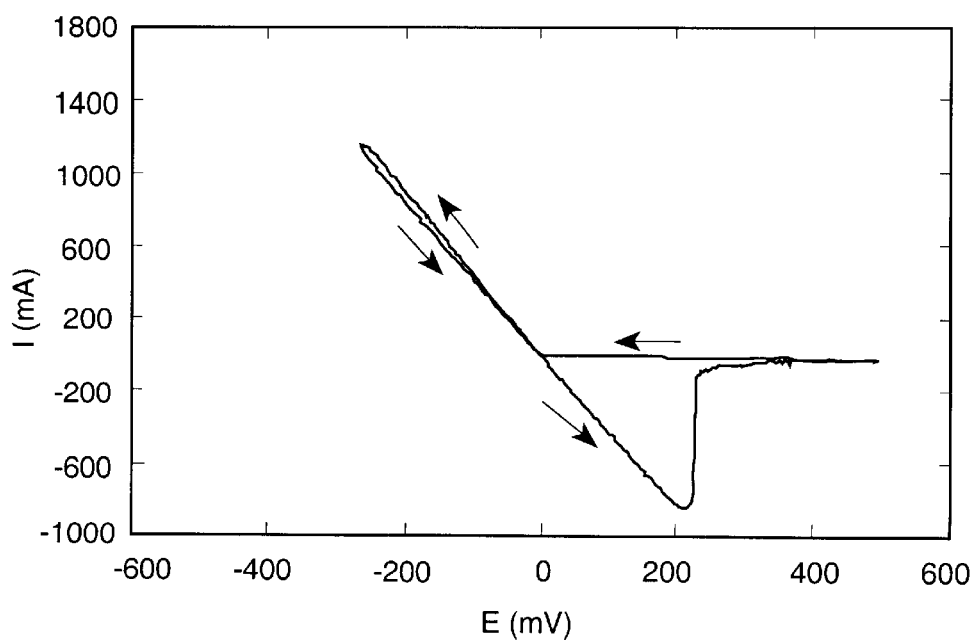
FIG. 9 is a cyclic voltammogram of test cell #1 at +25° C.

The cyclic voltammogram of test cell #1 at 25° C. is shown in FIG. 9. The initial point for the cyclic voltammogram was 0.0 V and it was run first cathodic and then anodic. The scan rate for this voltammogram was 20 mV/s. The peak current in the anodic region was 854.0 mA at 214.3 mV.

Test Cell #2

Figure 10:
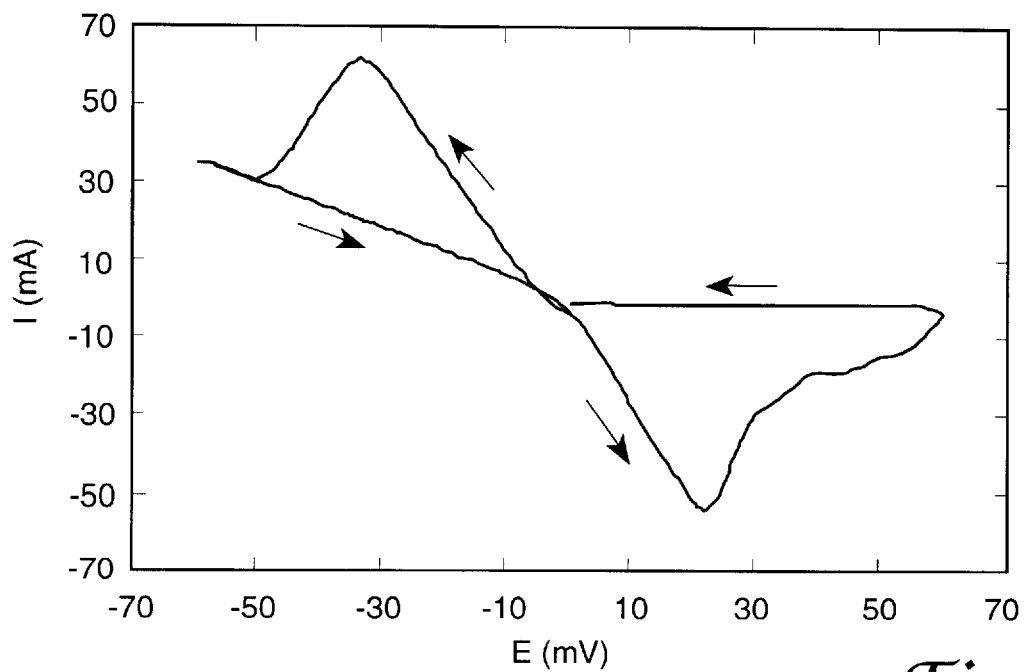
FIG. 10 is a cyclic voltammogram of test cell #2 at +28° C.

The cyclic voltammogram of test cell #2 at 28° C. is shown in FIG. 10. The scan rate was 10 mV/s. Dilithium phthalocyanine was made into a pellet with a thickness of 483 $\mu$m. The resistance of the cell as determined by complex impedance was 1 ohm at 0.1 Hz. The smallest electrode area, which was the lithium electrode, was 0.636 cm². Based on these parameters, the specific conductivity for the electrolyte is $7.6\times10^{-2}$ S/cm at 28° C. Once again, the plating and stripping of lithium, as shown in FIG. 10, is consistent with the transport of lithium ions through the solid state ionically conducting channel.

Test Cell #3

Figure 11:
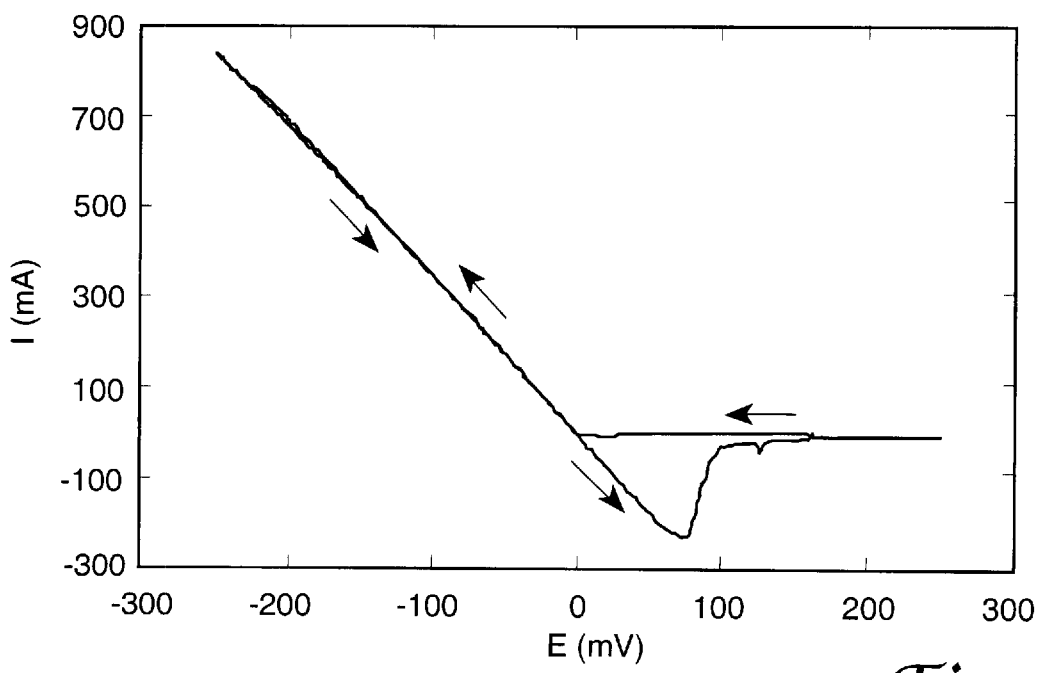
FIG. 11 is a cyclic voltammogram of test cell #3 at +27° C.

In the experiments described above for test cells #1 and #2, the dilithium phthalocyanine was used as received from sample containers with the same Lot Number. In the context of verifying experimental results, it was decided to use dilithium phthalocyanine that was from a different Lot Number and purified. The cyclic voltammogram of test cell #3 at 27° C., using the purified electrolyte, is shown in FIG. 11. The scan rate was 10 mV/s. The pellet of dilithium phthalocyanine was 495 μm thick. The smallest electrode area, which corresponds to the lithium electrode, was 0.785 cm². The peak current in the anodic region was 233 mA at 72 mV. The resistance of this cell was 0.5 ohms at 0.1 Hz as determined by complex impedance analysis. The specific conductivity of the electrolyte based on the aforementioned parameters was $1.26 \times 10^{-1}$ S/cm. A high impedance ohm meter was also used to measure the resistance of the cell which was 0.7 ohms. The agreement of the resistance values by the two techniques is consistent with the electrolyte being a single ion conductor. If both the cation and anion were conducting, one would not expect to see such agreement.

Figure 12:
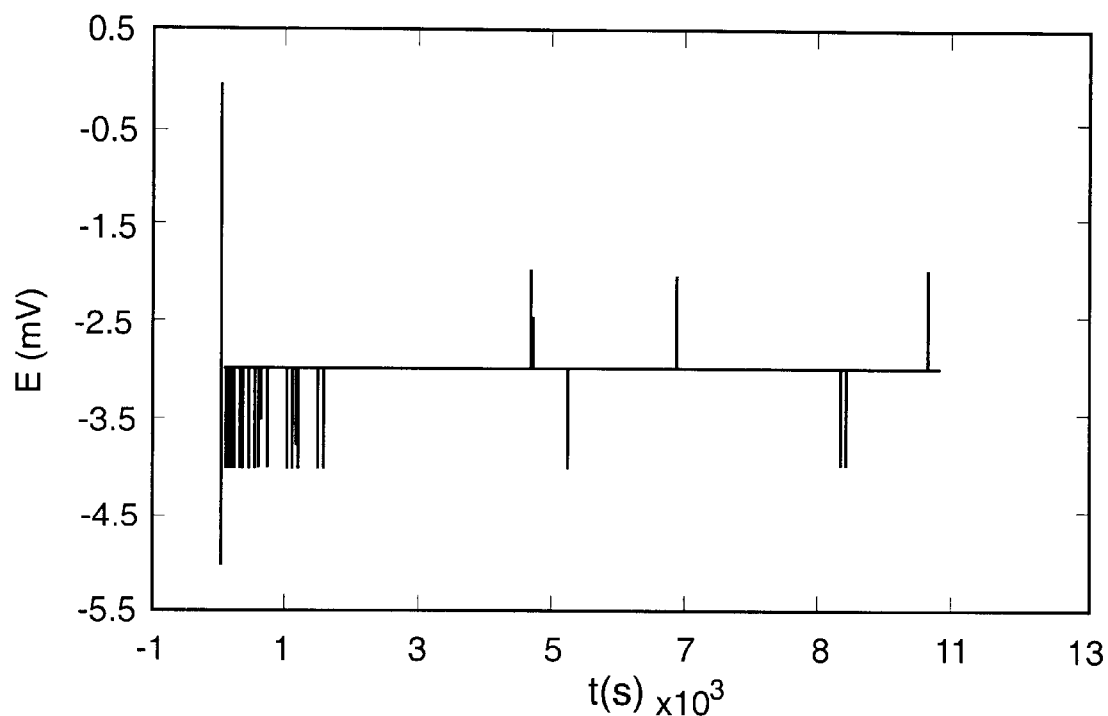
FIGS. 12 and 13 illustrate the galvanostatic plating and stripping, respectively, of test cell #3 at +27° C.
Figure 13:
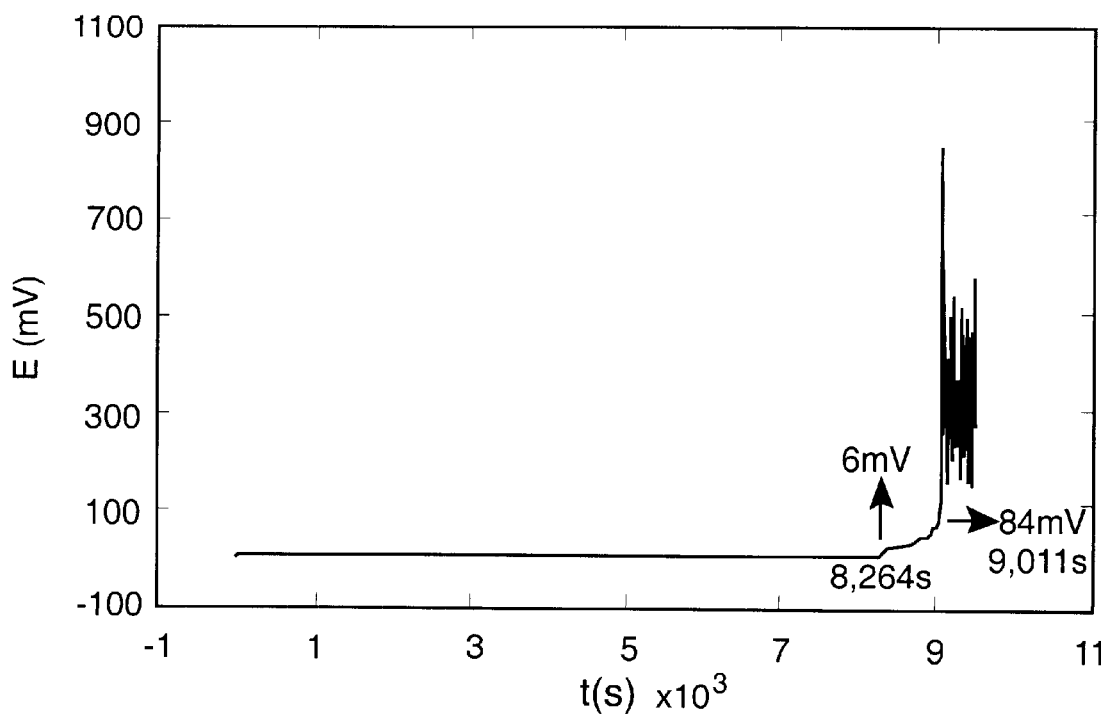

A constant current charging and discharging experiment was run on test cell #3 after the cyclic voltammogram. This is shown in FIGS. 12 and 13. The current was 10 mA and the charging/discharging time was set for 3 hours. The constant current charging profile shows voltage fluctuations perhaps due to unstable interface contact, however, the discharge profile is free of these fluctuations. After running the discharge experiment for $8.264 \times 10^3$ seconds, the voltage was 6 mV. This would correspond to a cell resistance of 0.6 ohms similar to that observed in the prior experiment. However, at $9.011 \times 10^3$ seconds the voltage rises sharply to 0.9 volts suggesting that lithium was depleted from the working electrode. These results would correspond to a coulombic efficiency of 83%. The resistance of the cell after the charging/discharging experiment was completed was 4.6 ohms as determined by complex impedance. The increase in resistance that was observed when the cell was over discharged is perhaps to be expected since the electroneutrality of the electrolyte is being affected in the over discharged state and resistance increases.

Computational Methods

Gaussian 98 was used to perform the geometry optimizations for dilithium phthalocyanine ($Li_2Pc$), $(Li_2Pc)_2$ and $(Li_2Pc)_3$ in the gas phase. The Hartree-Fock method of calculation was used for these optimizations with a 3-21G basis set. Electronic energy differences between products and reactants at 0 K were calculated as a measure of the bond energy between adjacent dilithium phthalocyanine molecules in $(Li_2Pc)_2$ and $(Li_2Pc)_3$. Hyper Chem was used to calculate and display the negative electrostatic potentials for two porphyrin dianions separated by 7 Å. Each porphyrin dianion had first undergone a geometry optimization prior to the Hyper Chem calculation using the Hartree-Fock method of calculation and the 6-31G(d) basis set.

Figure 14:
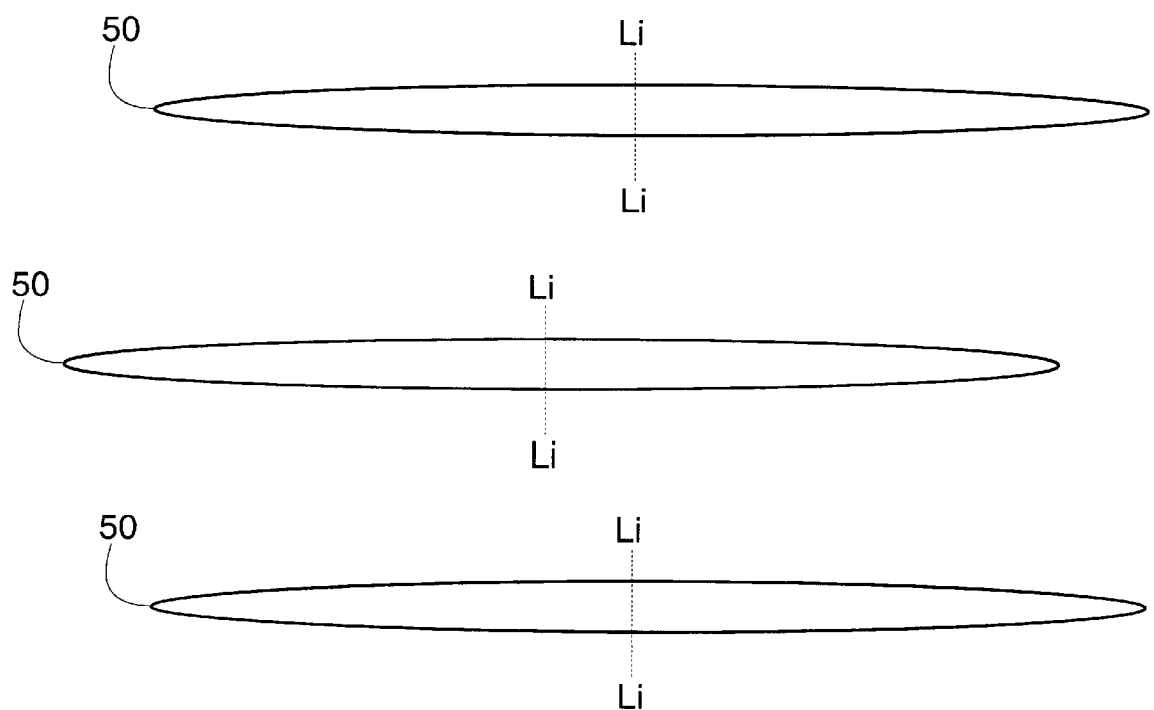
FIG. 14 represents molecular self-assembly of dilithium phthalocyanine.

The calculated electronic energy for the dilithium phthalocyanine ($Li_2Pc$) complex is $-1662.4368917$ Hartrees at 0° K. (1 Hartree=627.5095 kcal/mol). The lithium ions are positioned above and below the plane of the phthalocyanine ring. One would expect this, since the highest negative electrostatic potential is located in the center of the ring and there is electrostatic repulsion between the lithium ions. The electronic energies for the $(Li_2Pc)_2$ and $(Li_2Pc)_3$ complexes at 0° K. are $-3324.9409051$ and $-4987.42769845$ Hartrees, respectively. The calculated bond energies between these molecules are 42.1 and 73.4 kcal/mol, respectively. The strength of these bonds originates from the electrostatic attraction of lithium ions and nitrogens from adjacent phthalocyanine rings. The nitrogens have a partial negative charge. This suggests that one can take advantage of this attraction for molecular self-assembly of these molecules in order to form an ionically conducting channel as shown in FIG. 14, wherein each phthalocyanine ring is represented by the ellipse labeled 50. Although ring alignment is not cofacial, the important feature is the ring separation of about 2.5 to 3 Å which should insure that there is good overlap of the negative electrostatic potential contours for lithium ion conduction. Preliminary results of high-resolution TEM conducted at Argonne National Laboratory suggest that the solid state ionically conducting material used in the experiments discussed previously, dilithium phthalocyanine, is arranged in a three-dimensional lattice.

Having thus described exemplary embodiments of the present invention, it should be noted by those skilled in the art that the disclosures herein are exemplary only and that alternatives, adaptations and modifications may be made within the scope of the present invention.

I claim:

1. An electrolyte consisting of a di-lithium phthalocyanine of the formula:

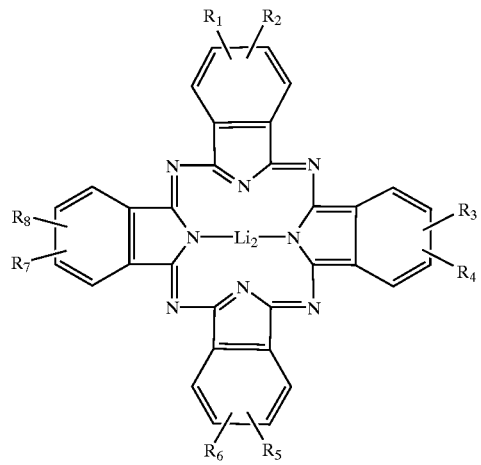

wherein the $R_1$ through $R_8$ groups are the same or different, and are independently selected from H, $C_1$ to $C_{20}$ alkyl, $C_2$ to $C_{20}$ alkenyl, $-X^1-COO-X^2$, $-X^1-O-Y$, $-X^1-C_6H_5$ and $-X^1-COZ$, wherein $X^1$ is selected from the group consisting of a chemical bond, $-(CH_2)_n-$ where n is 1 to 20, $-(CH_2)_a-CH=CH-(CH_2)_b-$ wherein a and b each has a value of 0 to 20 and the sum a+b has a value of 1 to 20, $X^2$ is selected from the group consisting of $C_1$ to $C_{20}$ alkyl, $C_2$ to $C_{20}$ alkenyl, Y is selected from the group consisting of $C_1$ to $C_{20}$ alkyl, $C_2$ to $C_{20}$ alkenyl, or H, and Z is selected from the group consisting of $-OH$ and $-NR^1R^2$ wherein $R^1$ and $R^2$ are selected from the group consisting of H, $C_1$ to $C_{20}$ alkyl and $C_2$ to $C_{20}$ alkenyl.

2. The electrolyte of claim 1 wherein each R group is $-H$.

3. An electrolyte in accordance with claim 1 formed by compressing a quantity of said di-lithium phthalocyanine to form an electrolyte pellet.

4. An electrolyte in accordance with claim 1 formed by casting from a low dielectric solvent.

* * * * *